J. A. PERKINS.
CAR JOURNAL BOX.
APPLICATION FILED DEC. 9, 1908.
1,002,442.
Patented Sept. 5, 1911.
5 SHEETS—SHEET 3.
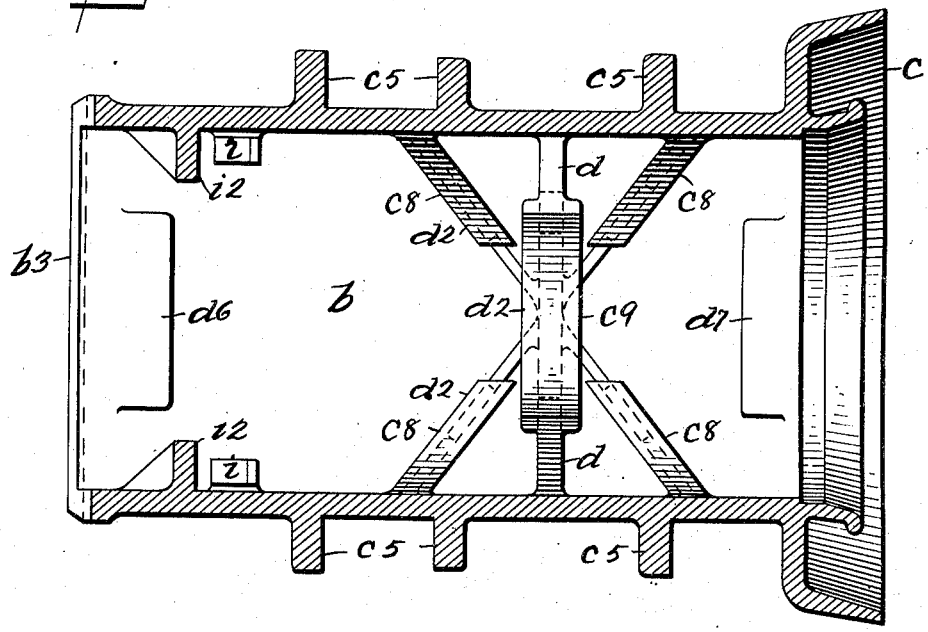
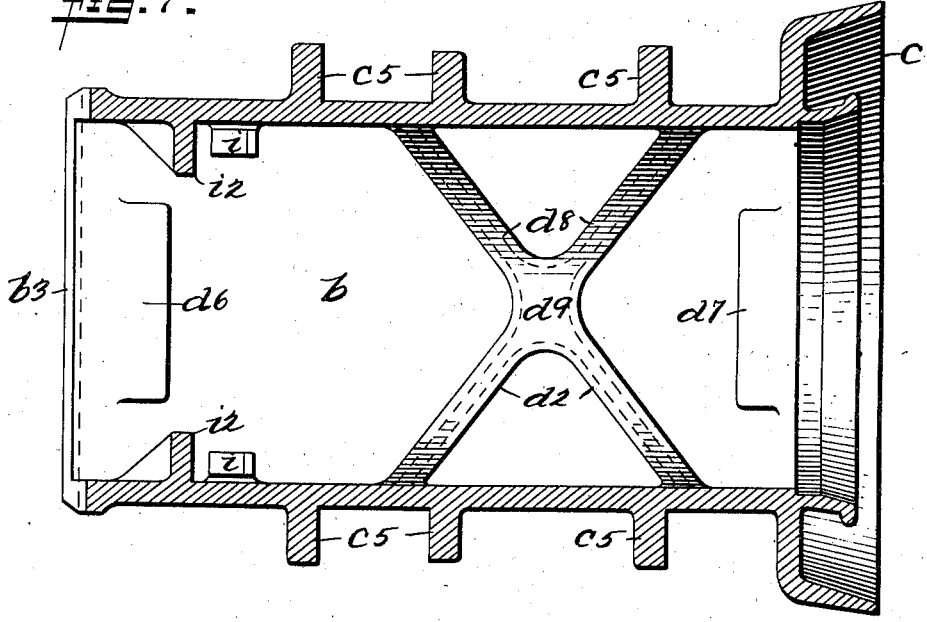
Attest:
Inventor:
Julius A. Perkins
by
his Atty

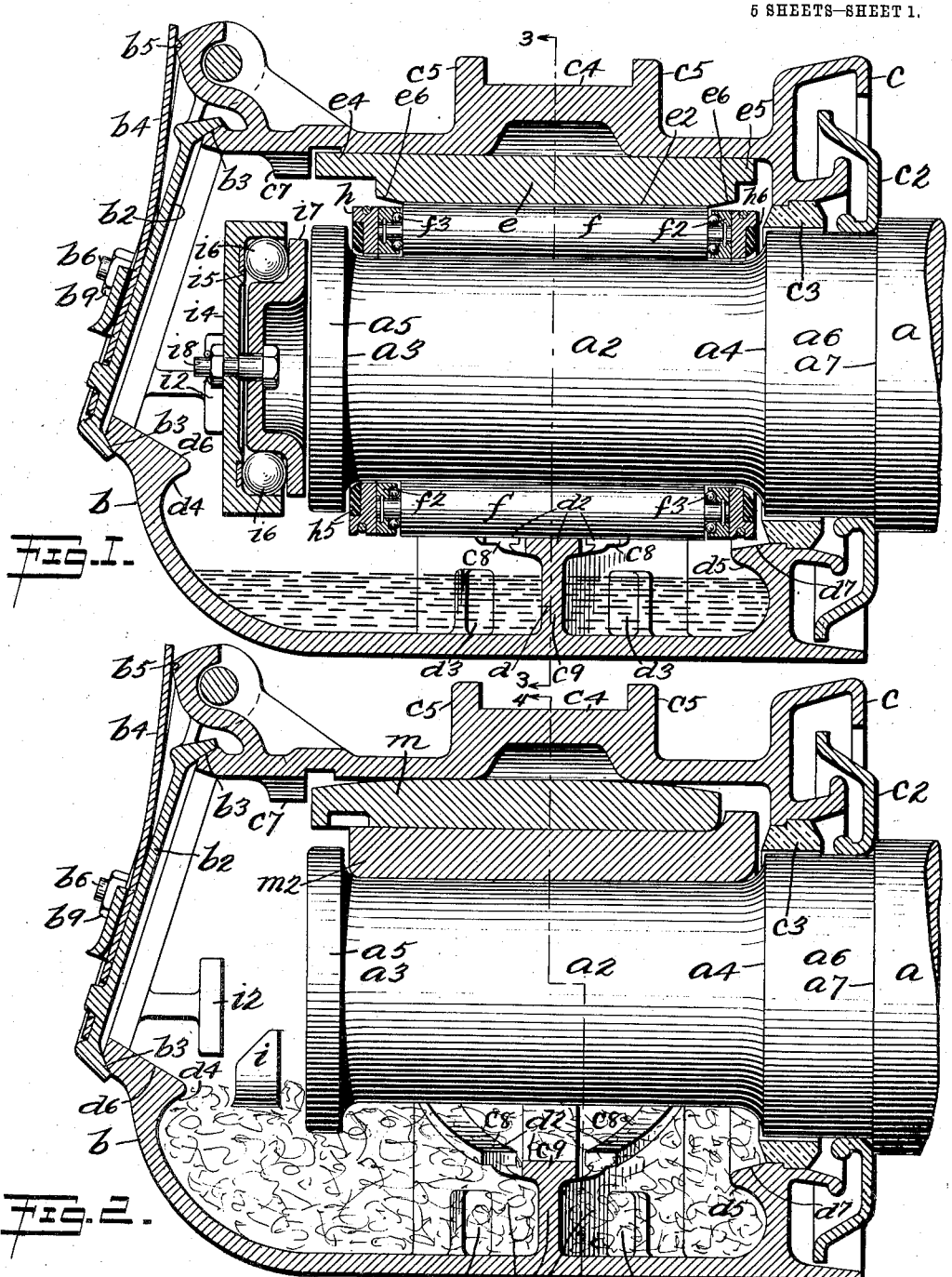

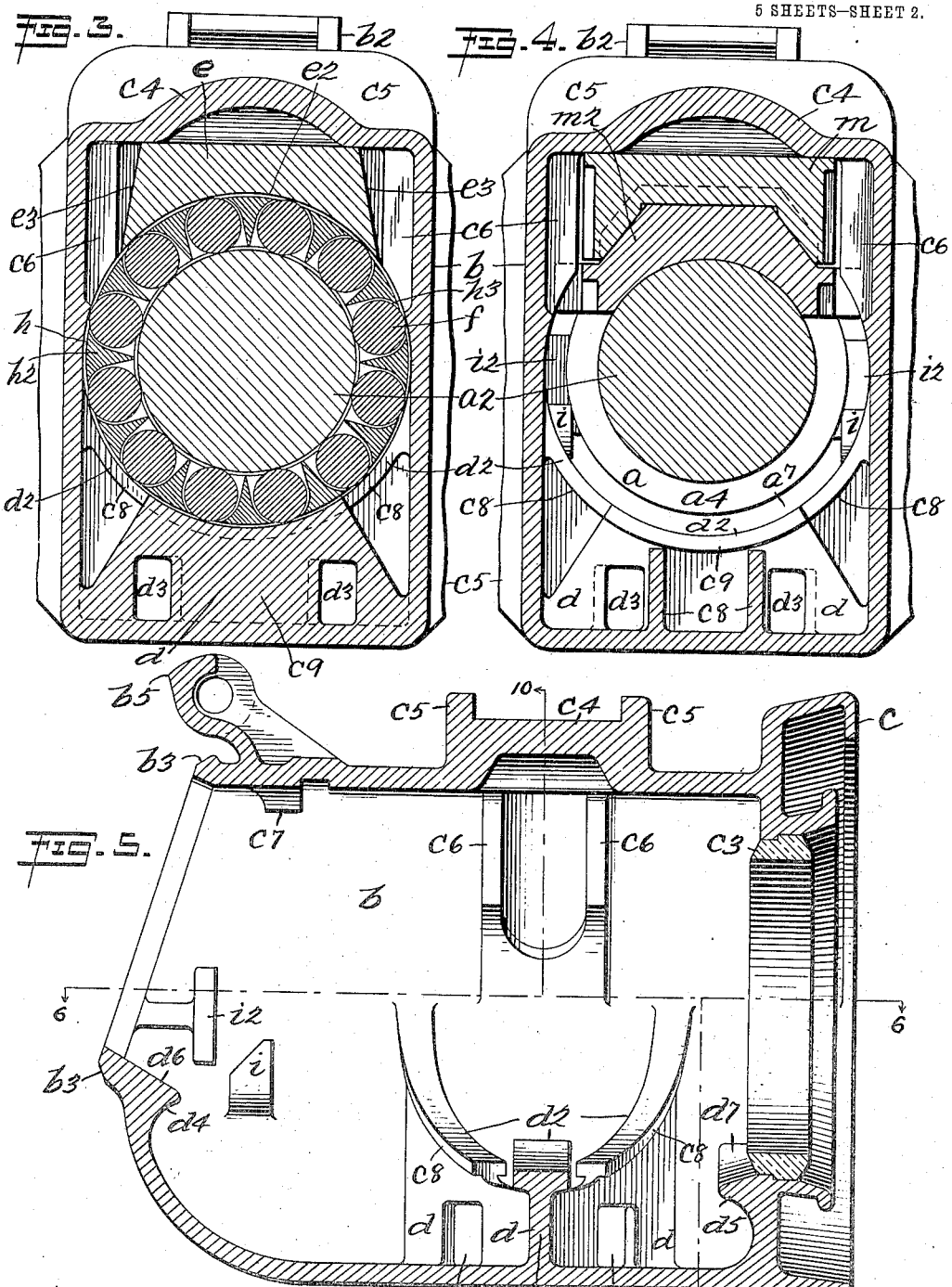

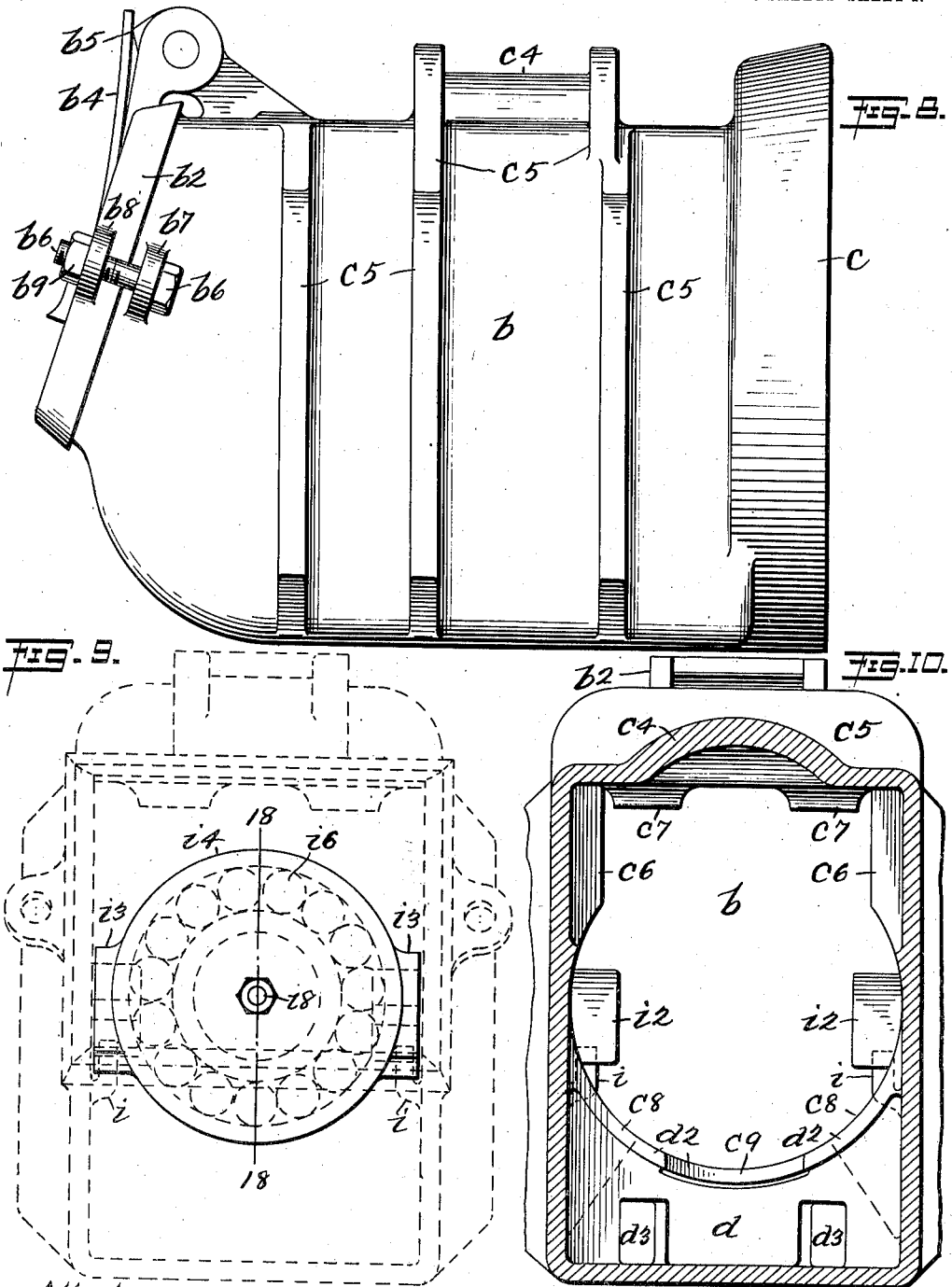

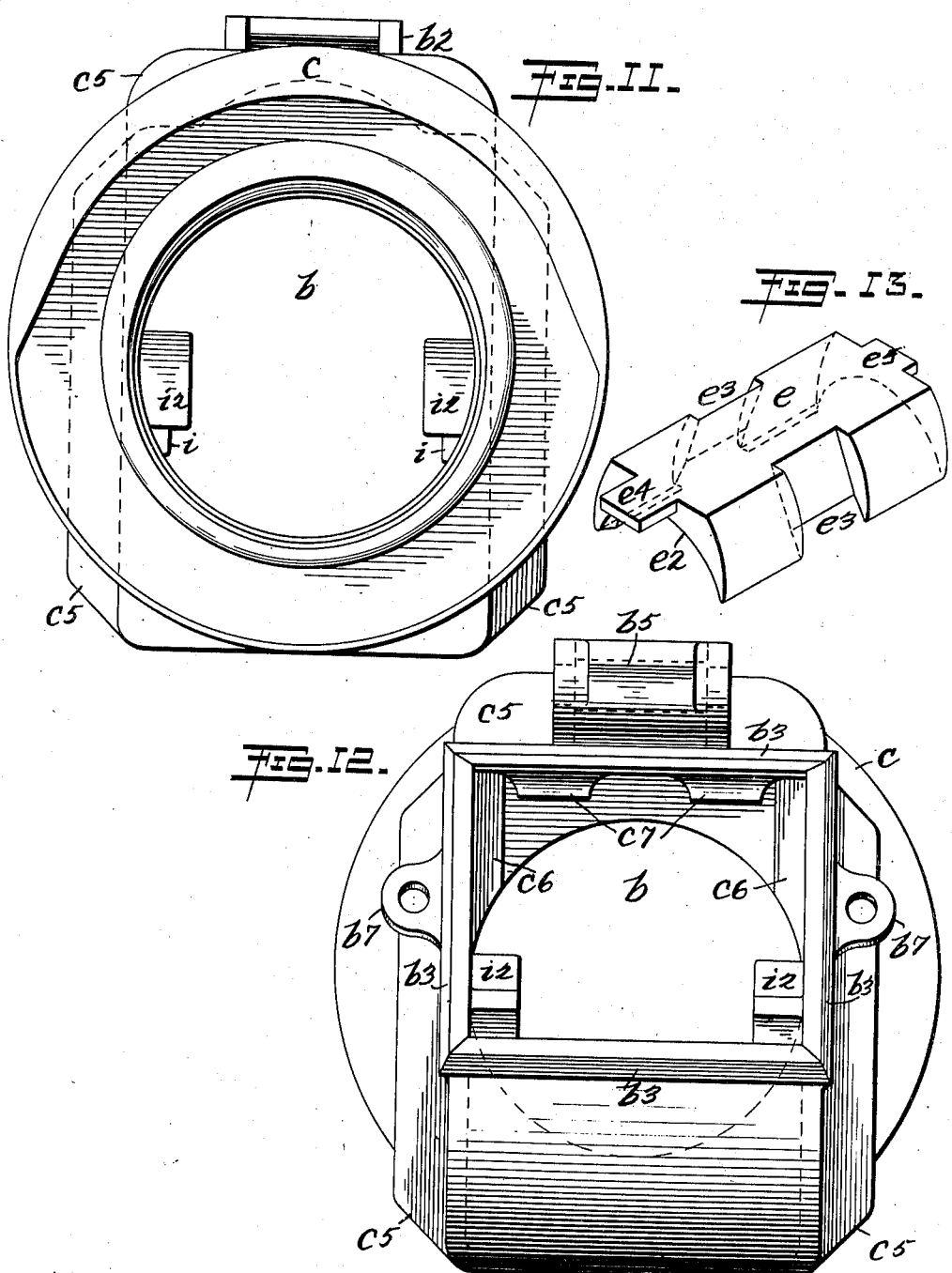

UNITED STATES PATENT OFFICE.

JULIUS A. PERKINS, OF OMAHA, NEBRASKA.

CAR JOURNAL-BOX.

1,002,442.     Specification of Letters Patent.     Patented Sept. 5, 1911.

Application filed December 9, 1908. Serial No. 466,582.

*To all whom it may concern:*

Be it known that I, JULIUS A. PERKINS, a citizen of the United States of America, and residing at Omaha, in the county of Douglas and State of Nebraska, have invented certain new and useful Improvements in Car Journal-Boxes, of which the following is a specification, such as will enable those skilled in the art to which it appertains to make and use the same.

This invention relates to railway car construction, particularly to the journal bearings thereof, and the object of this invention is to provide a journal-box, to replace those at present employed, whereby uniformity is secured upon the various types of rolling stock, of any motive power, of different load capacity, and for either freight, passenger or other service.

A further object is to provide a car journal-box which is interchangeably adapted to either the present brass friction bearings, or to non-frictional bearings, thus increasing the life of the axles and boxes, avoiding the necessity for frequent repairs and for frequent inspection, abolishing the use of lubricants and waste and decreasing the wear on the tracks and wheel flanges, thus decreasing maintenance cost, and obviating the probability of delays, due to hot boxes and the like on long journeys, and decreasing the required motive power, when the latter bearings are used, but permitting the use of the former when desired, or the substitution thereof when necessary, as in accidents, or on other extraordinary occasions.

A further object is to provide roller bearings for use in my journal-boxes, which are non-frictional in themselves, and which embody end-guides whereby the roller end-thrust is taken non-frictionally and which permit the said roller bearings to accommodate themselves to structural differences and inequalities in the journals, roller race-ways and boxes.

A further object is to provide means, at each end of the axles, for taking the journal end-thrust non-frictionally, and which are readily detachable when not required.

A further object is to provide means for compensating for untrue or unequal roller operation, when roller bearings are employed.

A further object is to provide a journal box which permits of the ready assembling therein of either the frictional or non-frictional bearings, and which conforms, exteriorily, to the present standard trucks, and adapted for ready connection therewith, without change therein or in the journal-box or axles; and a still further object being to provide closures, for each open end of the journal-box, which prevent the admission of water, dust, or other foreign matter, to the box, in the use thereof with any type of bearings, and which also prevent the escape of oil or other liquid contained within the box.

My invention is fully described in the following specification, of which the accompanying drawings form a part, in which the separate parts are designated by the same reference characters in each of the views, and in which:

Figure 1 is a central, vertical, longitudinal, section taken through a journal-box constructed according to my invention and having roller bearings mounted therein; Fig. 2 is a similar view, but showing the usual wedge and brass frictional bearings therein; Fig. 3 is a section taken on the line 3—3 of Fig. 1; Fig. 4 is a section taken on the line 4—4 of Fig. 2; Fig. 5 is a view similar to Fig. 1, of the journal-box. Fig. 6 is a section taken on the line 6—6 of Fig. 5; Fig. 7 is a view similar to Fig. 6, but showing a modification thereover; Fig. 8 is an exterior elevation of my journal-box; Fig. 9 is a diagrammatic view of the outer end of my journal-box, and showing one element in full lines; Fig. 10 is a section taken on the line 10—10 of Fig. 5; Fig. 11 is a rear end view of my journal-box; Fig. 12 is a front end view thereof; Fig. 13 is a perspective view of a roller race-way which I employ.

In the drawings forming a part of this application, I have shown an axle $a$, of the standard type now in use, provided with a journal $a^2$ of reduced diameter forming shoulders $a^3$ and $a^4$, the former of which forms an end flange $a^5$, either integral or detachable, and the latter of which forms a dust guard seat $a^6$, of a diameter intermediate of those of the journal and axle, and forming a shoulder $a^7$ at the wheel seat.

Housing the journal and guard seat is a box $b$, open at each end, and provided with a cover $b^2$ abutting upon the box at an incline, as shown at $b^3$, and provided with a plate spring $b^4$ which rests upon a cam $b^5$ and serves to hold the cover in either a closed or open position and, when closed, I employ bolts $b^6$, passed through ears $b^7$ and $b^8$, and nuts $b^9$ for locking the cover in a closed position.

The box is provided, at the inner end, with a recess or casing $c$ into which passes a bent or curved plate $c^2$ sprung, shrunk, or otherwise secured, upon the guard seat $a^6$ to prevent the entrance of water, dust or other foreign matter, into the box $b$, and the escape of oil or other liquid therefrom, and I also employ a ring $c^3$, preferably detachably secured to assist in this result, but it will be observed that the lower part of the recess $c$ is downwardly flared to permit the escape of water or dust, which might enter the said recess.

Exteriorly of the box $b$ and approximately centrally thereof, I provide a saddle $c^4$ and flanges $c^5$, of the standard formation, whereby the box may be connected with standard trucks, and interiorly of the box $b$, at the top side thereof, I provide guiding lugs $c^6$, the lower ends of which are curved approximately concentric to the journal $a^2$, for reasons hereinafter explained, and adjacent the outer end of the box, interiorly thereof, I provide stops $c^7$ for the wedges or for the roller raceways, whichever may be used. Also, interiorly of the box $b$, at the bottom and sides thereof and approximately in line with the guides $c^6$, are roller tracks $c^8$ and $c^9$, approximately concentric with the journal $a^2$, the former of which are two in number and are inclined toward the latter, $c^9$, as clearly shown in Figs. 5 and 6, and terminate at a point some distance from the central line of the box, whereas the single track $c^9$ crosses the said center and terminates at a point some distance beyond the terminating points of the tracks $c^8$, each of said tracks comprising, preferably, web members $d$ and bearing members $d^2$, the former of which have openings $d^3$ therethrough to permit free passage to any lubricants or anti-rust liquids contained within the box, and also permitting adequate packing when frictional bearings are employed; and, as shown at $d^4$, and $d^5$, I curve the box ends, interiorly, upwardly and inwardly, in order to throw the said liquids toward the center of the box, and for any part thereof which might pass the said curved members, I provide downwardly inclined tables $d^6$ and $d^7$ which return the said liquids to the box bottom.

In Fig. 7 of the drawings I have shown a slight modification over the roller track formation just described, in that I employ but two tracks $d^8$ which cross each other at $d^9$ centrally of the box $b$, the object being to provide, in each form, two roller bearing surfaces for the greater part of their movement and but one track, centrally of the rollers, for that part of their movement when they carry no load, in order that the rollers being then centrally balanced may be re-adjusted for another cycle of movement in the event of their untrue or unequal operation due to inequalities therein or in the journal or raceway surfaces over which they operate, or to stresses and in order to permit the clearance of scales or other undesirable matter from the rollers.

In Figs 1, 3, and 13, I have shown a roller raceway which I employ in connection with my non-frictional bearings, said raceway comprising a body member $e$ having a bearing surface $e^2$, approximately concentric with the journal $a^2$, side recesses $e^3$ into which the corresponding guiding lugs $c^6$ enter and are engaged, and having also two end projections $e^4$ and $e^5$, the former of which is longer than the latter, both serving to hold the said raceway in position between the stops $c^7$ and the inner box end at the casing $c$, these projections being made of different lengths in order that no mistake may be made in assembling the bearings, and the guiding lugs $c^6$ accurately position the said raceway in its relationship to the journal $a^2$, and to the curvature of the lugs $c^6$ which form a link between said raceway block and tracks.

Interposed between the journal $a^2$ and the raceway $e$, lugs $c^6$ and tracks $c^8$ and $c^9$, are a plurality of solid rollers $f$, in Figs. 1, and 3, mounted in a cage $h$, provided with a plurality of ribs $h^2$, forming roller spaces $h^3$, having reduced guiding recesses $h^4$ at the ends thereof for the reception of cups or blocks $f^2$ carried at the roller ends and having interposing balls $f^3$, this particular construction of roller bearings being fully illustrated, described and claimed in my application for Letters Patent filed November 3, 1908, Serial Number 460,833 but it will be understood that any suitable form of the said roller bearings or cage may be substituted for the form shown herein, the object and desired results of the said roller bearings being to prevent friction and consequent wear upon either the journals or raceways, or upon the rollers themselves at the ends thereof, and to permit, because of the radial movement possible of the roller ends, automatic adjustment of the said roller bearings to diametrical differences in the journals, raceways and rollers, and to structural inequalities and imperfections therein, and permitting, also, independent end movement of the rollers when centrally balanced and supported as just described, for readjustment and clearance, whereby a practically indestructible bearing is produced which materially reduces the amount of motive power required over the present bearings.

In connection with the cage $h$, I also employ cage controllers $h^5$ and $h^6$ which are adapted to take the impact of the cage against the shoulders $a^3$ and $a^4$, said controllers being composed of fiber or other antifriction material and being also so formed as to conform to the curvature of said shoulders, and, in order to readily assemble my roller bearings, when assembled upon the journal, within the box $b$, I incline the ends of the roller raceway block $e$, as clearly shown at $e^6$.

In Fig. 3 I have shown the cage $h$ solid, for use where the end-flange $a^5$ is detachable from the journal $a^2$, but as in general practice, this flange is integral with the journal, I may form the cage $h$ in two parts as clearly shown in the application hereinbefore referred to and in that filed by me on the 28th day of October, 1908, Serial Number 459,815, but the said cage, as well as the roller bearings, may be otherwise modified to accommodate the same to my journal box.

Within the box $b$, and adjacent the front thereof, I provide two inclined rests $i$ and two abutments $i^2$, the former of which support lugs $i^3$ upon a cup $i^4$ provided with a ball race $i^5$ within which are balls $i^6$ and against which a plate $i^7$ bears, forming a non-frictional means for taking the journal end-thrust, it being understood that these means are duplicated upon the other end of the axle, and the abutments $i^2$ serve to maintain the cup $i^4$ in the plane of the journal end flange $a^5$ and to take the strain of the thrust but permit the ready removal of the said thrust means, the plate $i^7$ being held in position by means of a bolt $i^8$, thus permitting the free rotation independently of the cup $i^4$ which is held stationary.

The preceding description has been based upon the use of non-frictional bearings within my journal box, but in Figs. 2 and 4, I have shown the ordinary journal bearings, comprising the wedge $m$ and brass $m^2$, mounted therein, neither of which requires any change from the standard forms now in use, the wedge and brass, jointly, occupying the same space as the non-frictional bearings and being held in position by the guide lugs $c^6$ as are also the roller raceway blocks $e$ when employed and, when this frictional bearing is employed, I use the usual waste and lubricants, as shown in Figs. 2 and 4, but, when non-frictional bearings are employed, I require no lubricants but use, instead, any desired anti-rust liquid, which is vaporized by the agitation thereof, due to the motion of the car, and is deposited as a film on the operating elements within the box.

In view of the fact that the external diameter of the assembled bearings is not so great as the internal diameter of the raceways, the rollers clear the journal when beneath the same and bear directly upon the said tracks, this release from the journal being possible because of the movement of the rollers radially thereof, said release, and subsequent engagement, being gradual because of the slight difference in the radii of the bearings and of the track raceways, thus permitting the journal to clear itself of any particles of matter which might rest thereon and permitting also, the lowermost rollers to adjust themselves upon the single track bearing at the center thereof, previous to another cycle of movement, in which they take the load by degrees.

It will be thus seen that I provide a journal box which is interchangeably adapted, exteriorly, for connection with standard trucks and, interiorily, is adapted for the interchangeable use of the usual frictional brass and wedge bearing and of non-frictional bearings, as well as for the interchangeable use of frictional and non-frictional axle-thrust devices, and I also provide suitable non-frictional bearings and axle-thrust devices, whereby the cost of inspection and maintenance is practically eliminated, whereby a car is practically certain to reach very distant destinations without accidents other than from exterior causes and without the necessity for as great motive power as with the boxes and bearings now in use.

Having fully described my invention, what I claim as new, and desire to secure by Letters Patent, is:—

1. A car journal box, a journal therein, said box being provided with interior lugs, from each side thereof, curved concentrically with said journal, a raceway block recessed in the position of said lugs to receive the same, and rollers interposed between said journal and block, and coöperating with said lugs.

2. A car journal box, a journal therein, said box being provided with interior lugs, from each side thereof, curved concentrically with said journal, a raceway block held by said lugs, and rollers interposed between said journal and block, said lugs serving also as bearings for said rollers at the curvature thereof.

3. A car journal box, a journal therein, said box being provided with interior lugs, from each side thereof, a raceway block held by said lugs and provided with end projections of unequal lengths serving to insure correct assembling in said box by preventing the engagement of said block, if reversed, with said lugs, said box being provided with stops against which said projections impinge, and rollers interposed between said journal and block.

4. A car journal box, a journal therein, said box being provided with interior lugs, from each side thereof, curved concentrically with said journal, a raceway block held by said lugs, rollers interposed between said journal and block, and a cage for guiding said rollers, said rollers coöperating with said lugs.

5. A car journal box, a journal therein, said box being provided with interior lugs, from each side thereof, curved concentrically with said journal, a raceway block held by said lugs, rollers interposed between said journal and block, a cage for said rollers, and bearing blocks on the ends of said rollers radially movable in said cage, said rollers coöperating with said lugs.

6. A car journal box, a journal therein, said box being provided with interior lugs, from each side thereof, curved concentrically with said journal, a raceway block held by said lugs, rollers interposed between said journal and block, a cage for said rollers and anti-frictional end thrust devices interposed between said rollers and cage, said rollers coöperating with said lugs.

7. In a car journal box provided with a journal and anti-friction rollers, a raceway block for said rollers, comprising a body portion curved interiorly concentric with said journal, means for connection with said box, and means, comprising unequal end projections on said block for insuring correct assembling in said box, by preventing the engagement of said block, if reversed, with said box.

8. In a car journal box provided with a journal and anti-friction rollers, a raceway block for said rollers, comprising a body portion curved interiorly concentric with said journal, means for engagement with said box comprising lugs in said box and corresponding recesses in said block, and means, comprising unequal end projections on said block for insuring correct assembling in said box, by preventing the engagement of said block, if reversed, with said box.

9. In a car journal box provided with a journal and rollers about said journal, a cage for said rollers, bearing blocks interposed between said rollers and cage, a raceway block held in said box, and means for positioning said block with respect to said rollers, said block being interiorly beveled away from said rollers at the ends thereof to prevent pressure at said ends.

10. A car journal box, a journal therein, rollers guided around said journal, and a raceway block for said rollers, said box being provided at the bottom with a refuse receptacle having roller supports extending into said box from each side thereof, and a single central support extending between said side supports and overlapping the ends thereof, whereby a refuse receiving space is formed of greater length than said rollers.

11. A car journal box, a journal therein, a raceway block therein, a plurality of tracks in said box, at the bottom thereof, and rollers interposed between said journal and block, said block and tracks serving as roller raceways, and said tracks supporting the ends of said rollers for a portion of their travel, and the centers of said rollers only when said rollers are beneath and in the axial plane of said journal.

12. A car journal box, a journal therein, a raceway block therein, tracks in said box, at the bottom thereof, provided with passages for liquids, and rollers interposed between said journal and block, said block and tracks serving as roller raceways, and said tracks supporting the ends of said rollers for a portion of their travel and the centers of said rollers only when said rollers are beneath and in the axial plane of said journal.

13. A car journal box provided with roller raceways, a journal therein, rollers interposed between said journal and raceways, a cage for guiding said rollers in their planetary movement, and a track eccentric to said journal whereby said rollers may clear said journal at the point of greatest eccentricity, said rollers being movable radially of said journal in said cage to accomplish this result.

14. A car journal box, a journal therein, a removable raceway block, rollers interposed between said journal and block, a cage for guiding said rollers, and cage controllers on said cage, said journal being provided with shoulders, and said controllers conforming to the configuration of said journal and shoulders.

15. A car journal box, a journal therein, a raceway block therein, rollers interposed between said journal and block, a pair of roller end supporting tracks extending into said box, at the bottom and from either side thereof, for a predetermined distance, and a roller center supporting track beneath and in the axial plane of said journal, said track spanning the space between said pairs of tracks and arranged between the tracks of each pair, said block and tracks serving as roller raceways.

16. In a car journal box provided with a journal and lugs extending inwardly from each side thereof, a raceway block, comprising a body portion provided with recesses in the sides thereof to receive said lugs, and being curved interiorly concentric with said journal, and rollers interposed between said journal and block.

17. In a car journal box provided with a journal and anti-friction rollers, a raceway block for said rollers, and means for centering said journal and block in said box, comprising elements on either side of said box interior serving as bearings for said rollers.

In testimony that I claim the foregoing as my invention I have signed my name in presence of the subscribing witnesses this 5th day of December 1908.

JULIUS A. PERKINS.

Witnesses:
GEORGE E. MINER,
J. C. LARSEN.